US012064889B1

(12) United States Patent
Harris, II

(10) Patent No.: US 12,064,889 B1
(45) Date of Patent: Aug. 20, 2024

(54) RAZOR WITH ROTATABLE HEAD

(71) Applicant: John Robert Harris, II, Rancho Palos Verdes, CA (US)

(72) Inventor: John Robert Harris, II, Rancho Palos Verdes, CA (US)

( * ) Notice: Subject to any disclaimer, the term of this patent is extended or adjusted under 35 U.S.C. 154(b) by 0 days.

(21) Appl. No.: 18/231,215

(22) Filed: Aug. 7, 2023

Related U.S. Application Data

(60) Continuation of application No. 17/944,993, filed on Sep. 14, 2022, now Pat. No. 11,724,412, which is a division of application No. 17/107,289, filed on Nov. 30, 2020, now Pat. No. 11,446,836, which is a division of application No. 16/287,952, filed on Feb. 27, 2019, now Pat. No. 10,850,412.

(60) Provisional application No. 62/637,489, filed on Mar. 2, 2018.

(51) Int. Cl.
*B26B 21/52* (2006.01)
*B26B 21/40* (2006.01)
*B26B 21/22* (2006.01)
*B26B 21/50* (2006.01)

(52) U.S. Cl.
CPC ........ *B26B 21/521* (2013.01); *B26B 21/4012* (2013.01); *B26B 21/522* (2013.01); *B26B 21/222* (2013.01); *B26B 21/50* (2013.01)

(58) Field of Classification Search
None
See application file for complete search history.

(56) References Cited

U.S. PATENT DOCUMENTS

| | | | | |
|---|---|---|---|---|
| 5,093,991 A * | 3/1992 | Hendrickson | B26B 21/521 | 30/531 |
| 7,086,160 B2 * | 8/2006 | Coffin | B26B 21/227 | 30/527 |
| 9,259,846 B1 * | 2/2016 | Robertson | B26B 21/10 | |
| 10,814,508 B1 * | 10/2020 | Gilman | B26B 21/4062 | |
| 10,850,412 B2 * | 12/2020 | Harris, II | B26B 21/522 | |
| 11,446,836 B2 * | 9/2022 | Harris, II | B26B 21/521 | |
| 11,724,412 B2 * | 8/2023 | Harris, II | B26B 21/521 | 30/50 |
| 2006/0254060 A1 * | 11/2006 | Alliss | A01D 34/4161 | 30/276 |
| 2013/0152400 A1 * | 6/2013 | Nunez | B26B 21/22 | 30/47 |
| 2019/0255721 A1 * | 8/2019 | Psimadas | B26B 21/523 | |

FOREIGN PATENT DOCUMENTS

WO WO-2015007644 A1 * 1/2015 ............. B26B 21/24

* cited by examiner

*Primary Examiner* — Hwei-Siu C Payer
(74) *Attorney, Agent, or Firm* — Fulwider Patton LLP

(57) ABSTRACT

A two way razor is disclosed having a handle, a bracket, and a shaving head mounting dual opposing shaving cartridges each comprising a plurality of razor blades, and a swivel mechanism disposed between the handle and the bracket for exchanging the positions of the first and second cartridges' positions, the swivel mechanism comprising first and second disks where a first disk has two projections at opposite ends and a second disk has two recesses at opposite ends, such that the projections and recesses engage to lock the bracket in first and second orientations with respect to the handle.

3 Claims, 9 Drawing Sheets

RAZOR WITH ROTATABLE HEAD

CROSS-REFERENCES TO RELATED APPLICATIONS

U.S. Ser. No. 18/231,215, filed Aug. 7, 2023 is a continuation based on U.S. Ser. No. 17/944,993, filed Sep. 14, 2022, U.S. Pat. No. 11,724,412, issued Aug. 15, 2023; which is a divisional based on U.S. Ser. No. 17/107,289; filed Nov. 30, 2020; U.S. Pat. No. 11,446,836, issued Sep. 20, 2022; which is a divisional based on U.S. Ser. No. 16/287,952, filed Feb. 27, 2019, U.S. Pat. No. 10,850,412; Issued Dec. 1, 2020; which claims priority from U.S. Provisional Application No. 62/637,489, filed Mar. 2, 2018, the contents of which are fully incorporated herein by reference.

BACKGROUND

Disposable grooming razors are well known in the art. A typical razor sold today involves a multi-blade cartridge that is mounted on an elongate plastic handle, and the razor is used until the blades become dull. Some razors are completely discarded when the blades become dull, and some razors accept fresh blade cartridges to replace dull blades. To be specific with terminology, shaver head holds the cartridge, and the "cartridge" holds the razor(s). The handle and head may be retained for further use after the cartridge is discarded. While the preferences of the user dictate how many shaves are preferable before the razor is replaced, there is degree of waste associated with this type of razor where the razor cartridge has a very limited life cycle. The present invention aims to reduce the waste and dramatically increase the life cycle of the razor cartridge in a reliable and cost-effective manner.

SUMMARY OF THE INVENTION

The present invention is a grooming razor that utilizes a pivoting head arrangement where the head supports a pair of razor cartridges, each aligned for shaving in opposite directions. In one embodiment, a single shaving head holds two oppositely facing shaving cartridges. When each cartridge is oriented in respective diametrically opposed directions, it allows the cartridges to be utilized in a successive manner, where one direction cuts while the second direction strops the non-cutting blades, and then the opposite occurs in the second direction. That is, the blade's edges are being pushed, and will clean and strop the blades in the other cartridge that are being dragged simultaneously backwards across the skin in the opposite direction. In the present invention, the orientation of the second, or non-cutting, cartridge positions the blades flush against the skin, which has two significant repercussions. First, the motion of dragging the non-used blades across the skin has the effect of stropping the blades, thereby extending the useful life of the razor with each stroke. Second, the action of dragging the second set of blades across the skin in the non-cutting direction causes any whiskers, hair, shaving cream, and other clogging material to be pulled out of the blades. This creates a cleaning effect that eliminates or reduces the amount of rinsing necessary to utilize the second set of blades, and the second opposing cartridge providing the shaver with freshly stropped and cleaned blades for each and every subsequent stroke.

In this manner, the number of shaves can be dramatically extended before replacing the cartridge, reducing waste and improving the efficiency of the device. When operated with an elongate handle, the dual cartridge arrangement can be coupled to a spring and locking arrangement that flips the head one hundred eighty degrees and then locks the head in place. The flipping or rotating mechanism can be manual, or automatic where a press button causes a spring to rotate the cartridge back and forth between two positions, or 180 degrees in one direction depending on the rotating mechanism being used. In an alternate embodiment, the dual cartridge system can also be used with a small cage-like gripping device in lieu of an elongate handle, where the cage-like gripping device can be easily grasped by the fingers and allows the head to pivot along two different axes to better adjust to the surface to be shaven.

These, and other features of the invention, will best be understood in light of the detailed description below in conjunction with the accompanying drawings.

DETAILED DESCRIPTION OF THE PREFERRED EMBODIMENTS

Figure 1:
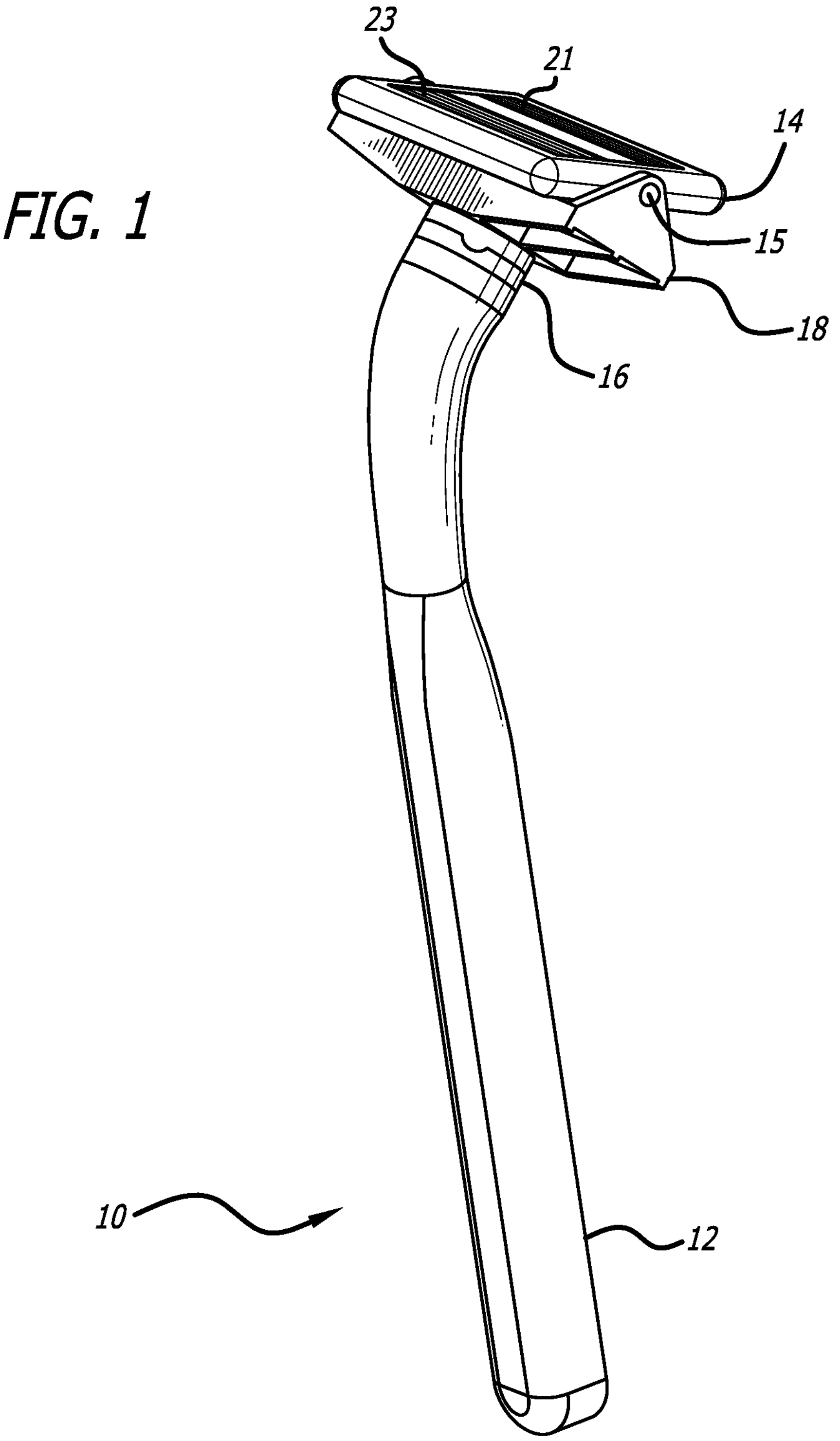
FIG. 1 is an elevated, perspective view of a first embodiment of the present invention.

FIG. 1 illustrates a first embodiment of a two way shaver 10 formed with an elongate handle 12 and rotating bracket 18 mounting a bi-directional shaving cartridge 14. The cartridge 14 may be equipped with first and second pegs 15 that lock into first and second holes 17 on the bracket 18 for releasable engagement thereto. The rotating bracket 18 is connected to the elongate handle 12 using a locking mechanism 16 that allows the bracket shaving head 18 to rotate approximately one hundred eighty degrees so that the bracket 18 can swivel to alternately face each set of blades 21, 23 toward the user. The locking mechanism 16 locks into place using a detente capture mechanism, as explained below.

Figure 2A:
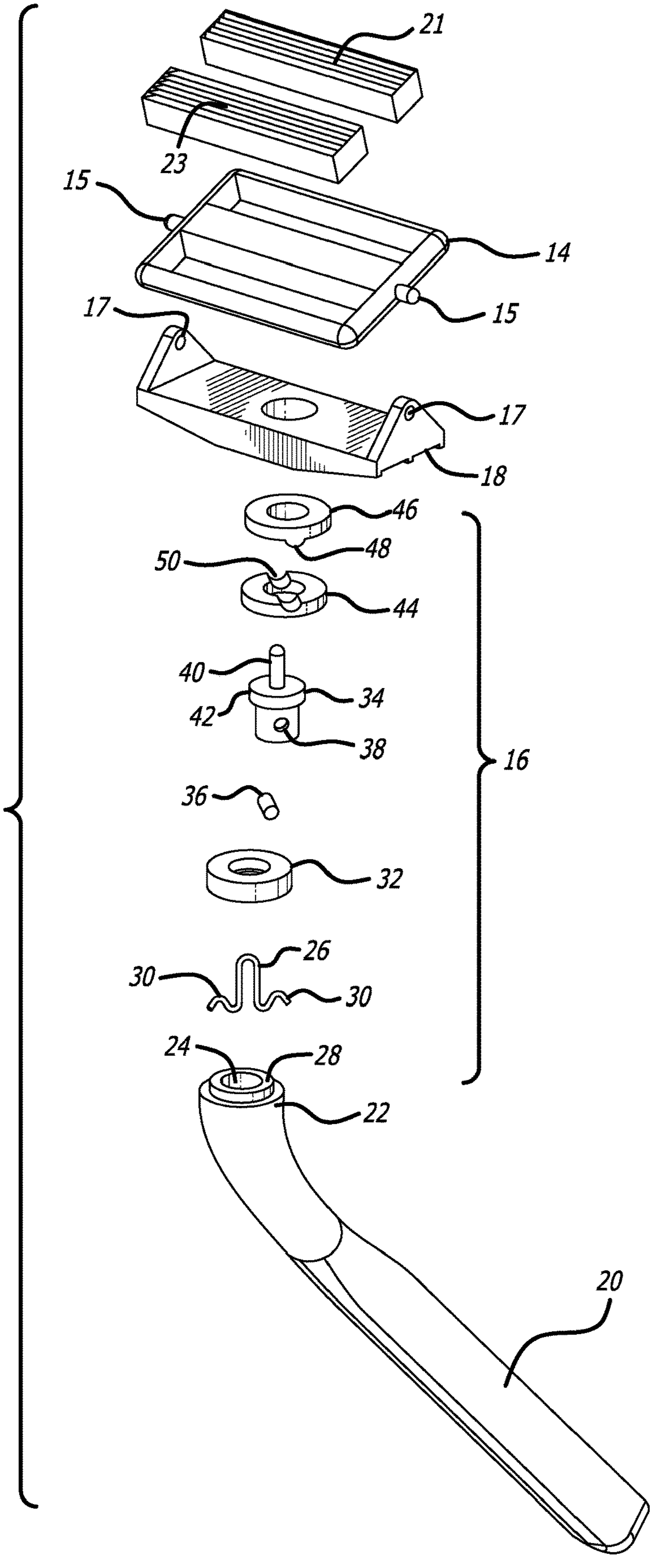
FIG. 2A is an exploded view of the embodiment of FIG. 1 from above.
Figure 2B:
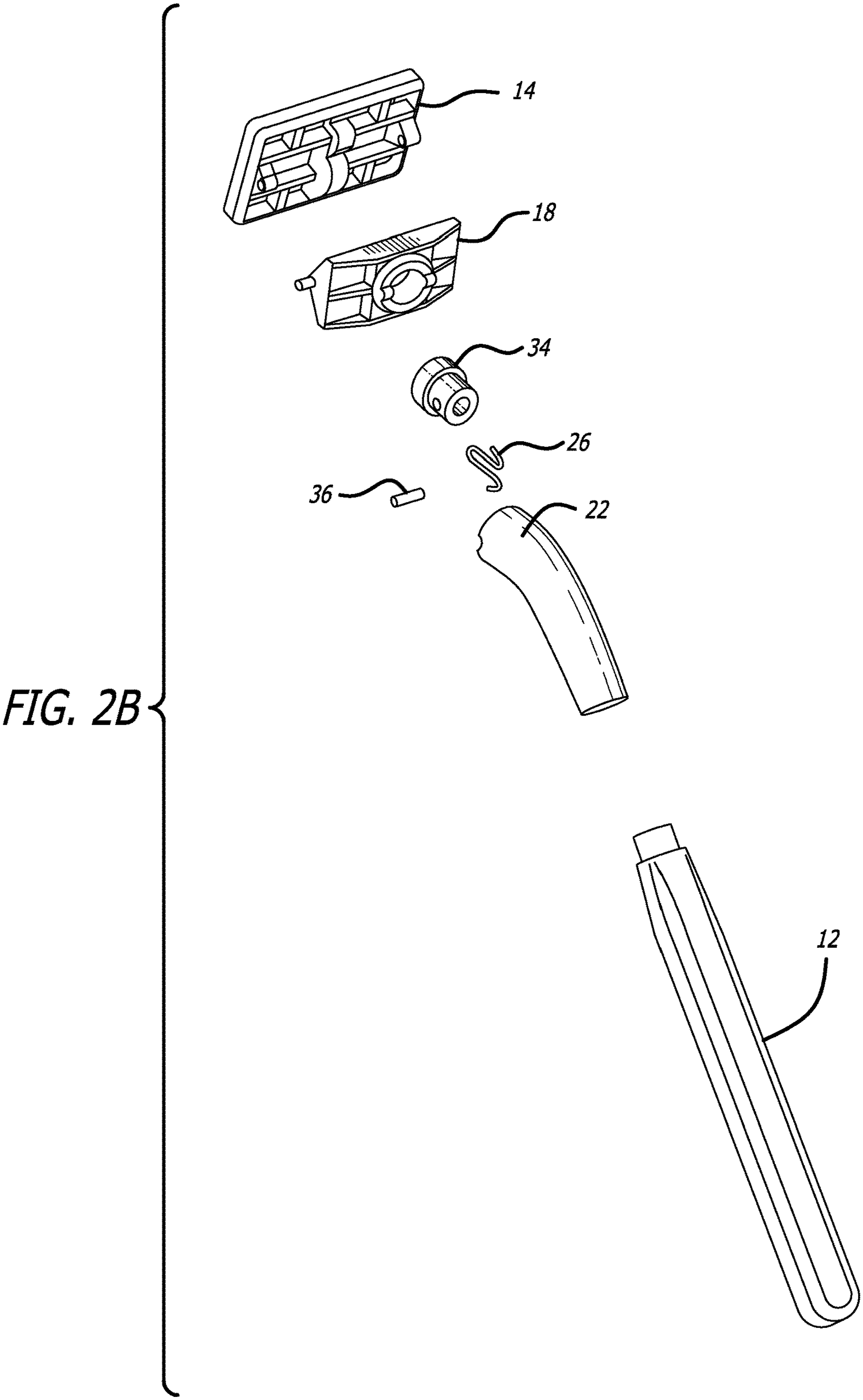
FIG. 2B is an exploded view of the embodiment of FIG. 1 from below.

The exploded view of FIGS. 2A and 2B illustrate how the bracket 18 connects to, and rotates around, the handle. The elongate handle 12 comprises a base 20 and a neck 22 adapted to receive the locking mechanism 16 of the present invention. The neck 22 is formed with an opening 24 that supports a wire spring 26 having arches 30 that are seated along a circular ridge 28 of the neck 22 about the opening 24. An annular washer 32 is mounted on the body of the spring 26, and an end cap 34 is positioned through the washer 32 and into the opening 24 of the neck 22 of the handle 12. The end cap 34 is held in place by a pin 36 that passes through a diametric opening 38. The end cap 34 includes a spindle 40 mounted on a plate 42, and the spindle 40 supports two mating annular disks 44,46, the first disk 46 with first and second downwardly facing projections 48 and the second disk 44 with first and second upwardly facing recesses 50. The projections 48 and recesses 50 are sized so that when the projections 48 are located in the recesses 50, the first and second disks 44,46 are flush with each other. The projections 48 and recesses 50 are located one hundred eighty degrees apart, such that there are two distinct orientations of the disks whereby the disks make a flush engagement. These two positions correspond to first and second positions of the bracket 18 with respect to the handle 12.

The rotating bracket 18 connects to the spindle 40 and can swivel/rotate about the spindle. The bracket 18 may be fixed to, and rotate with, the disk 46, while the other disk 44 can be fixed to the end cap 34, which in turn is locked in the opening 24 of the neck 22. In this manner, the bracket 18 can be rotated relative to the handle 12 and locked into one of the two orientations by engaging the respective projections 48 and recesses 50 until the disks are flush. When the disks 44,46 are aligned with their respective projections and recesses, the spring 26 provides a compressive force to bias the disks together in the flush arrangement, such that the system "locks" in place when the alignment is correct. The user may overcome the biasing of the spring 26 by manual force of rotating the disks out of alignment and into the alternate alignment when necessary to use the opposite set of blades 21, 23. Thus the bracket 18 may be rotated between two distinct positions, each corresponding with one set of blades 21,23 oriented toward the user. As the first set of blades is used up, the bracket 18 is simply rotated about the handle 12 until the disks 44,46 disengage and then reengage to lock in place, positioning the second set of blades in position for use. This process is repeated indefinitely thanks to the shropping effect of the non-active blade set.

Figure 3:
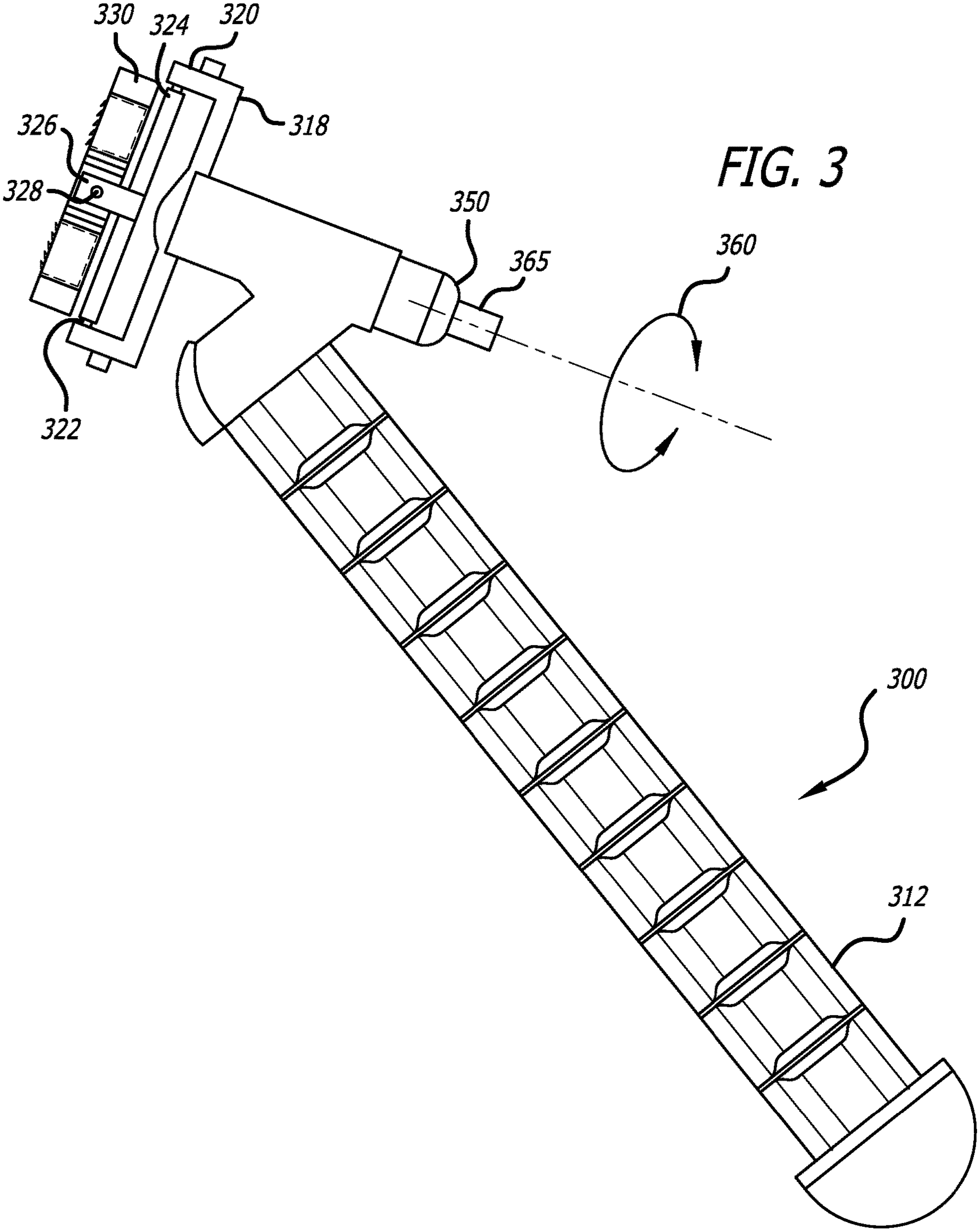
FIG. 3 is an enlarged, elevated perspective view of a second preferred embodiment.

FIG. 3 illustrates a second embodiment 300 of the shaver having an elongate handle 312 and a shaving head 318 designed for two rotational degrees of freedom. A U-shaped support 320 includes holes that receive pegs 322 of a cross member 324. Cross member 324 includes a second U-shaped bracket 326 with holes that receive pegs 328 in a cartridge 330, where the two U-shaped elements 320,326 are perpendicular to each other to permit the cartridge to rotate about two axes (namely, pegs 322 and pegs 328). The two degrees of rotation allow the shaver to more easily adapt to the many contours that may be shaven (scalp, chin, shins, etc.). The embodiment 300 further includes a rotation mechanism 350 that allows automatically rotates the head 318 between two orientations that are one hundred eighty degrees apart, as indicated by arrow 360. A spring loaded push button 365 operates like a ball point pen actuator to rotate the head 318 between the two positions, allowing the user to alternate which blade set is in the cutting position and which blade set is in the cleaning/shropping position.

Figure 4A:
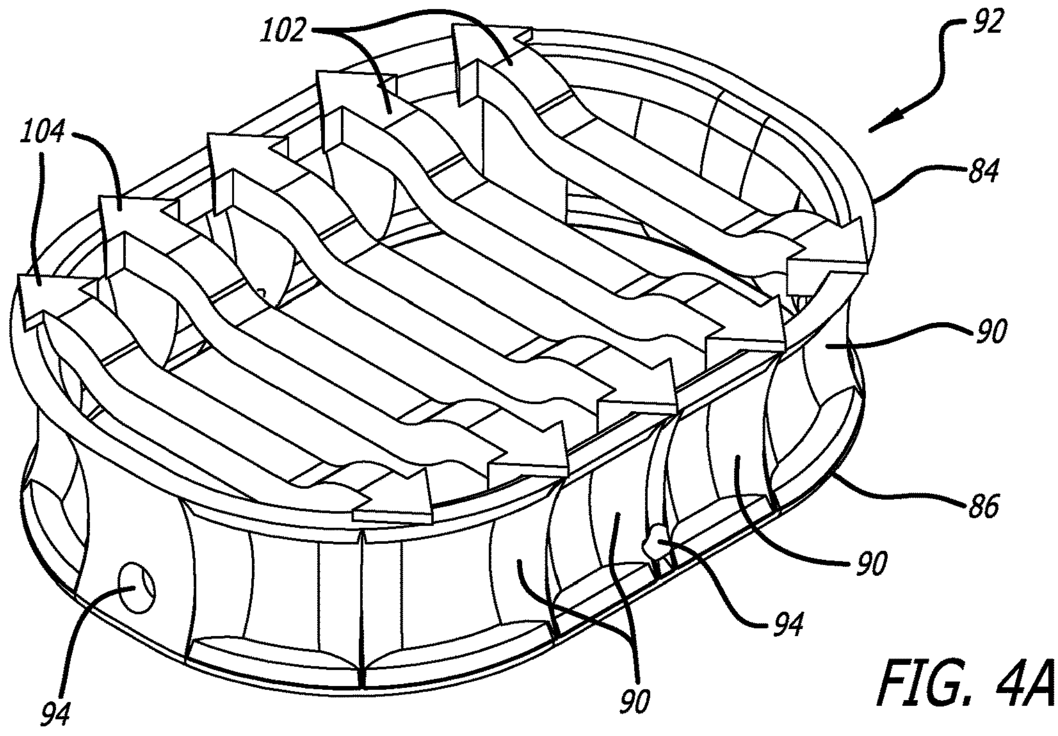
FIG. 4A is an elevated, perspective view of a handle for a third embodiment of the present invention.
Figure 4B:
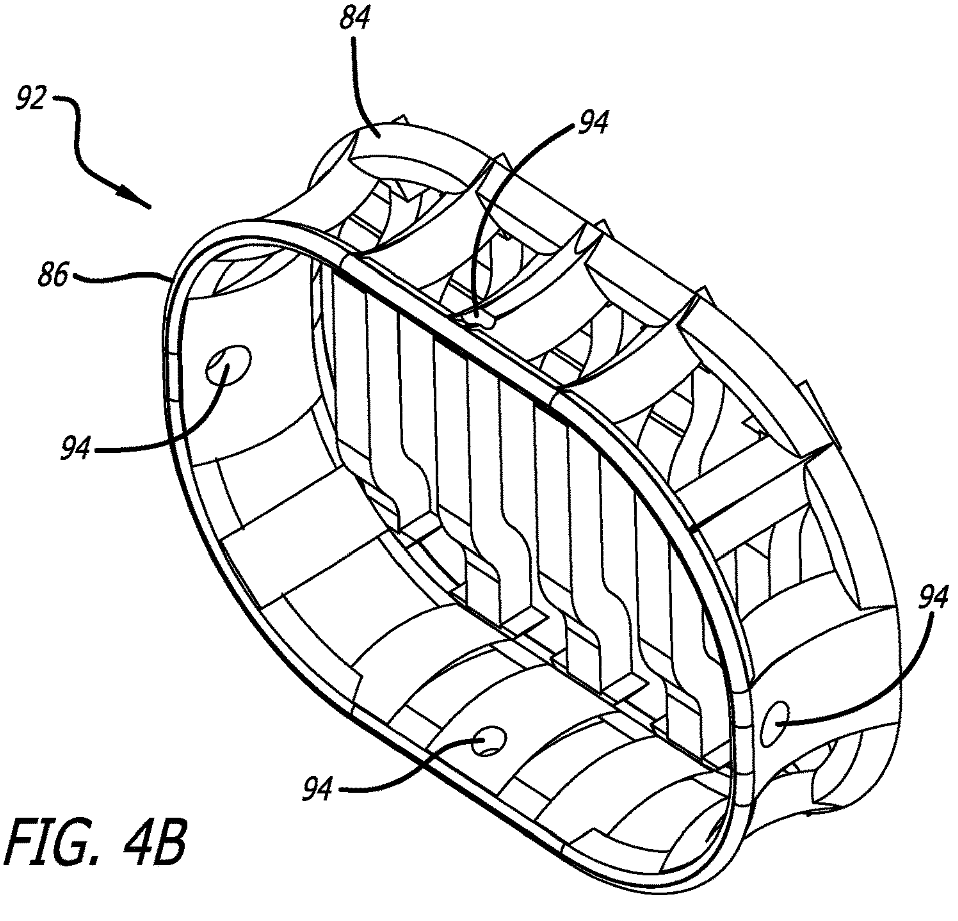
FIG. 4B is a rotated and inverted view of the handle of FIG. 4A.

FIGS. 4A and 4B illustrate a handle 92 for an alternative embodiment, where the shaving cartridge is incorporated into the handle that is gripped between the user's fingers. The handle 92 is comprised of two oval rings 84,86 connected with a plurality of recessed ribs 90. The handle 92 can be easily grasped between the thumb and forefinger of the user for greater control of the cutting surfaces. The handle also allows for areas to be groomed that are not convenient with an elongate handle, or is more easily handled by a more nimble device. The height of the handle 92 is such that the user's fingers will extend over the first and second oval rings 84,86 and glide along the surface to be shaved in the fore and aft positions, giving the user an immediate tactile feedback of the effectiveness of the shaving stroke. This feedback can reduce or eliminate the time consuming step of stopping and feeling the skin for stubble or missed hairs. Along the surface of the handle 92 opposite the cartridge is an plurality of cross beams 102 are aligned parallel to a minor axis of the oval. These cross beams 102 terminate in triangles 104 whose vertices extend slightly beyond the perimeter of the oval ring 84. These extending vertices of the triangles 104 provide greater contact points with the user's fingers, reducing slipping that can occur with wet, soapy surfaces. The triangles 104 form arrows that indicate the direction of the cutting orientation of the blades for each cartridge.

Figure 5:
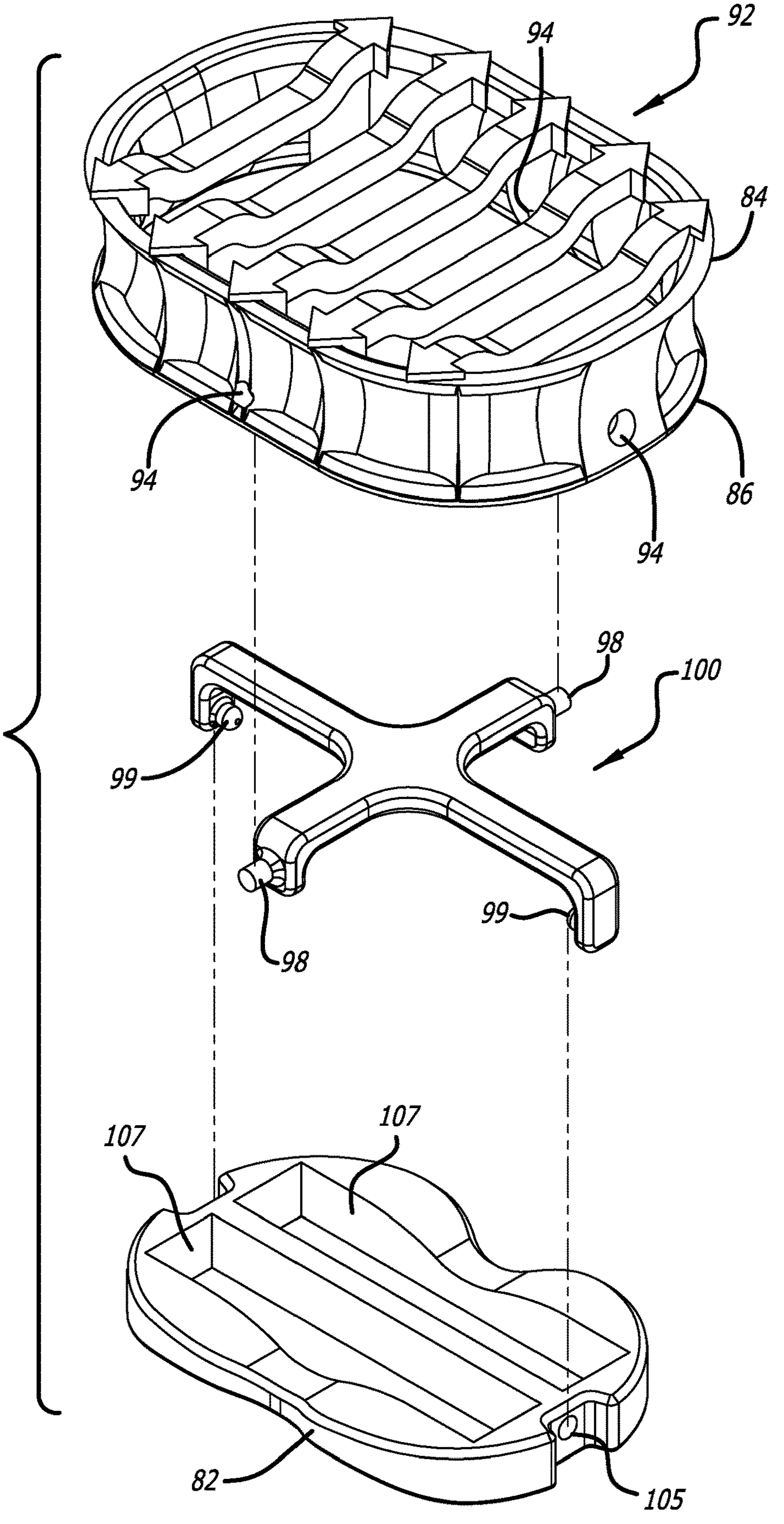
FIG. 5 is an exploded view of an embodiment using the handle of FIGS. 4A and 4B.
Figure 6:
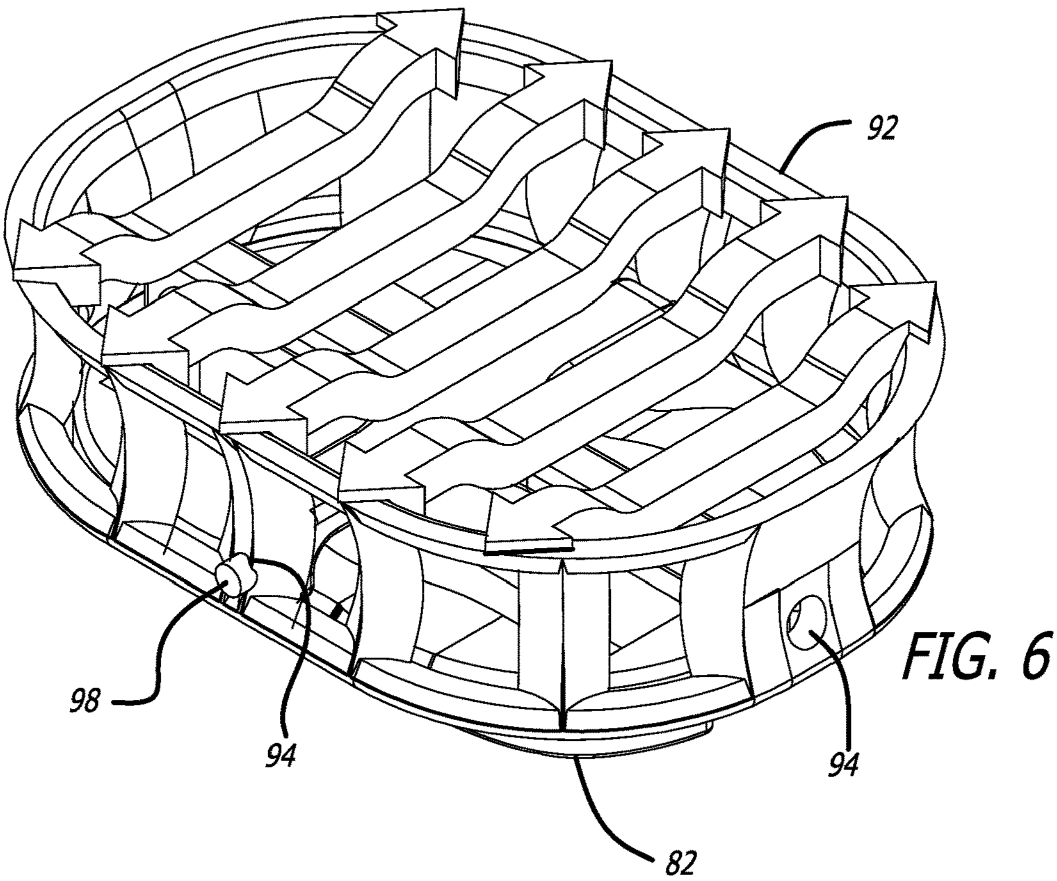
FIGS. 6 and 7 are elevated, perspective views of the embodiment of FIG. 5.
Figure 7:
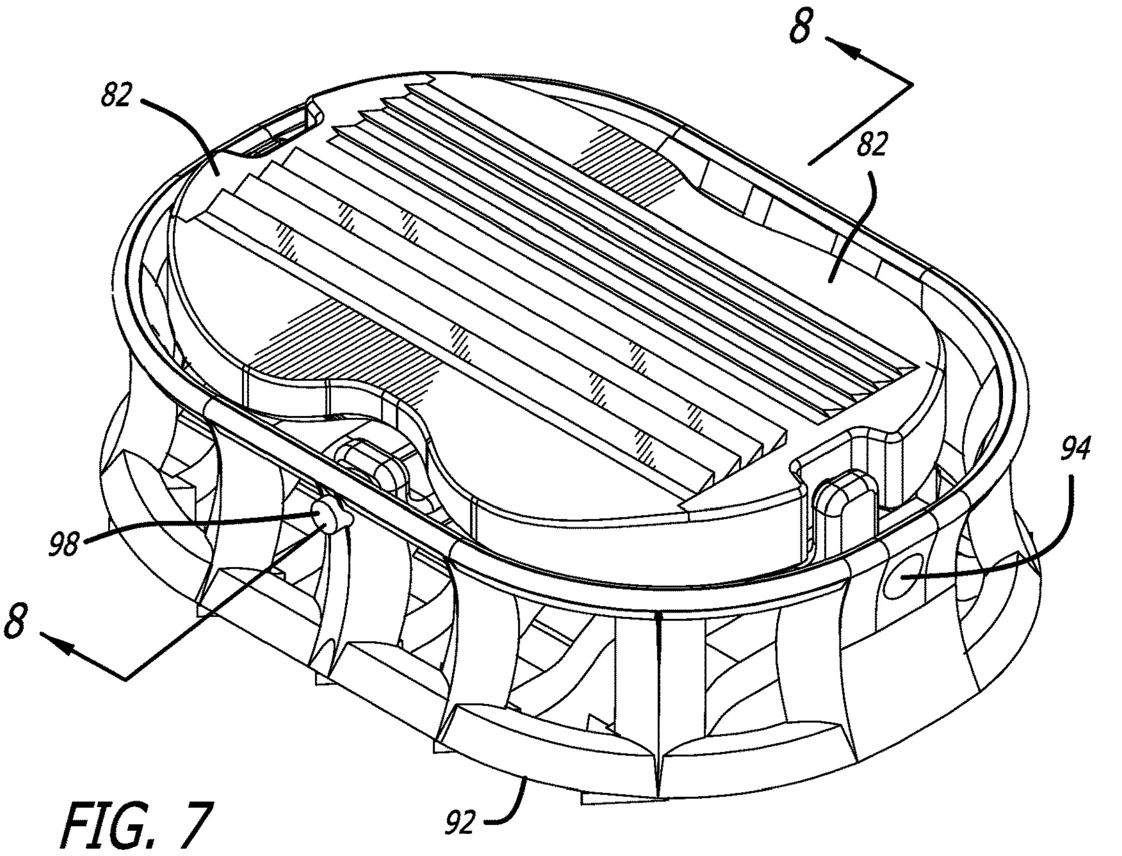

With further reference to FIGS. 4A, 4B, and 5, the handle 92, by virtue of the two oval rings 84,86 being spaced apart by the plurality of ribs 90, forms an open central space. Selected ribs 90 at ninety degree intervals include a hole 94 that each receive a peg 98 from a cross-shaped bracket 100. When the pegs 98 are inserted into the holes 94 in the selected ribs, the bracket 100 can pivot about the axis defined by the pegs 98. Further, the cartridge 82 includes holes 105 that receive pegs 99 on the bracket 100, allowing rotation about a second axis defined by the pegs 99. The cartridge 82 holds two sets of blades in cavities 107, with each set of blades oriented to shave in opposite directions. The dual pivoting motion provides added comfort and flexibility of the shaving instrument to accommodate many different angles and contours to be groomed. The oval ring 84 extends beyond the perimeter of the cartridge 82, so that there is a physical barrier at the edge of the shaver to protect cars, nose, and other areas proximal to the area to be shaved, but not intended to be shaved. FIGS. 6 and 7 illustrate the assembled embodiment 92, and FIG. 8 illustrates a cross-sectional view of the embodiment along lines 8-8 of FIG. 7.

Figure 8:
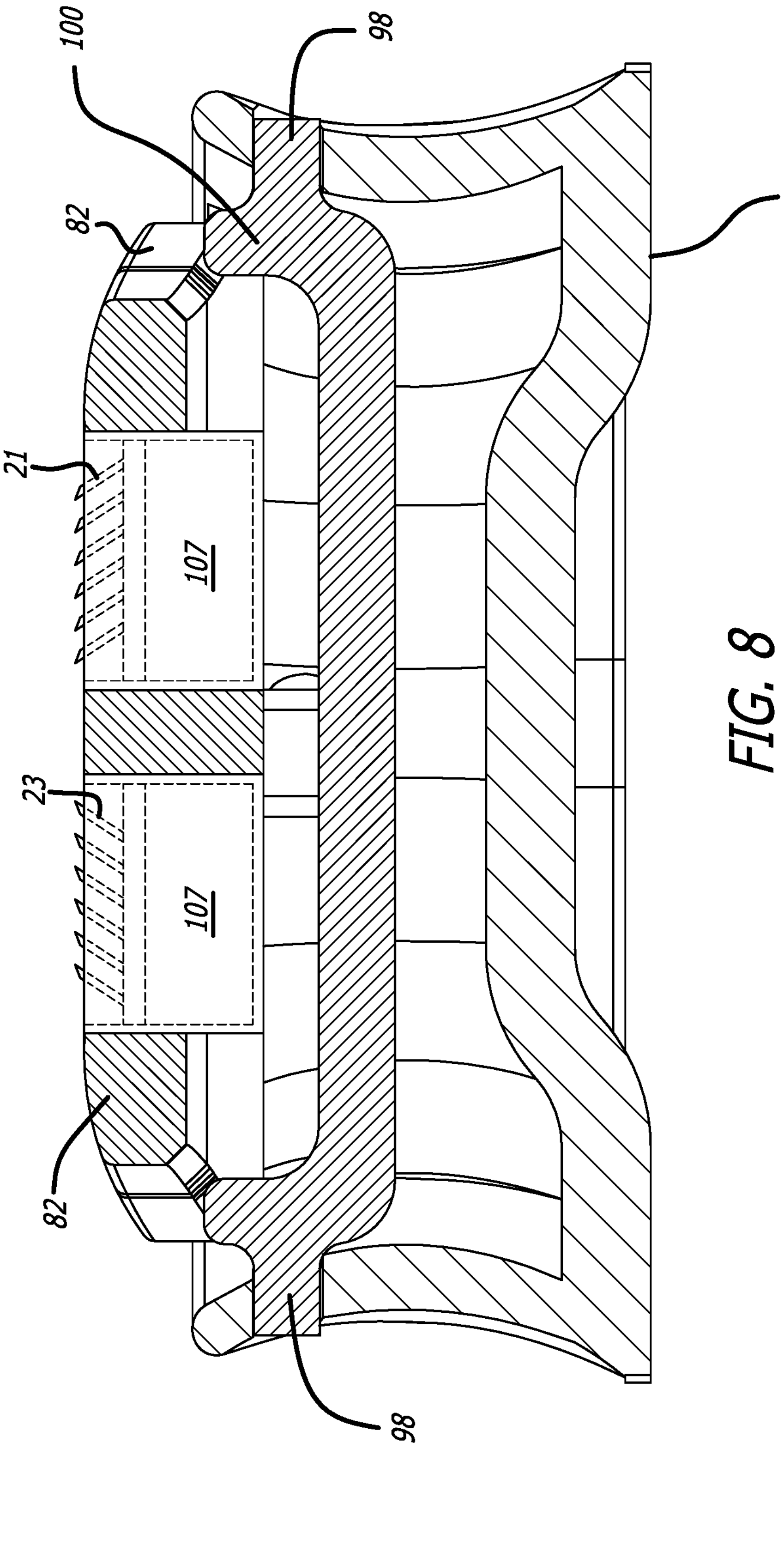
FIG. 8 is a cross sectional side view of the embodiment of FIG. 7 taken along lines 8-8.
Figure 9:
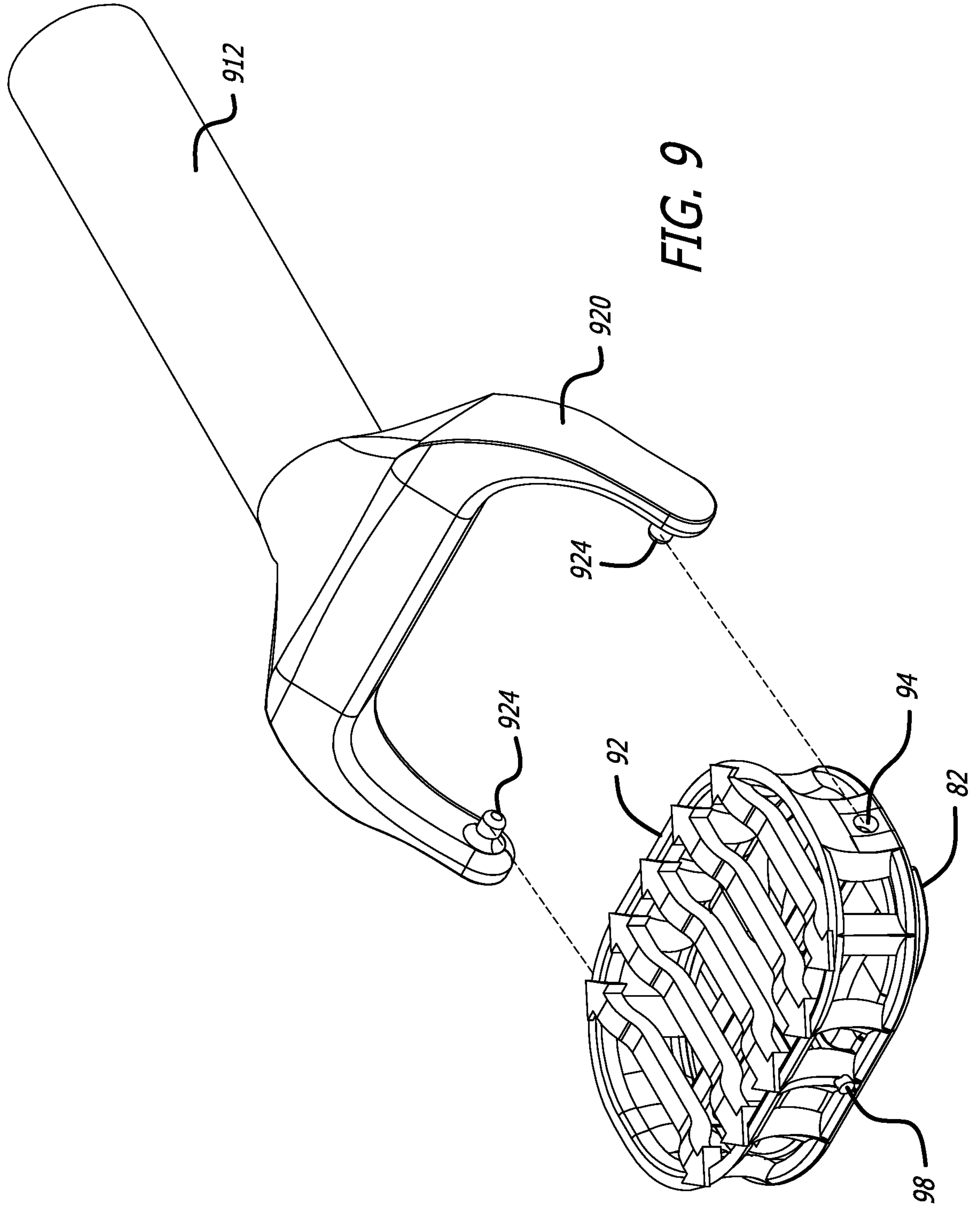
FIG. 9 is a connection of the embodiment of FIG. 5 mounted on an elongate handle.

FIG. 9 illustrates yet another embodiment of the invention, where the handle 92 of FIGS. 6-8 is attached to an elongate handle 912. The handle 912 is equipped with a U-shaped support 920 with opposed pegs 924, which in turn are received by holes 94 in the handle 92. This allows the handle 92 to operate as a shaving head in addition to the closely held grasping position of the non-elongate handle embodiment.

The present invention can also be used as a two-way shaving cartridge. That is, rather than rotating the cartridge every day (or other interval), the cartridge is used in both a fore-stroke and backstroke directions. This bi-directional mode makes it particularly suitable to shave difficult areas such as circular hair growth areas many men have on their necks where the hair pattern changes direction. Stroking with a regular shaver over areas such as these would require several singular direction stroking passes to obtain a clean shave, but by stroking in a bi-directional way (like a scrubbing motion), those irregular hair growth patterns easily shave cleanly with far fewer strokes, thereby reducing shaving time and possible skin irritation.

By dragging the blades backwards across the skin, that action tends to unclog the blades during use from soap, whiskers, etc. Additionally, the razor self-strops, thereby extending blade edge life, and self-cleans which decreases shaving time. It also can be used to remove suborn multi-directional hair pattern growths with bi-directional stroking.

Effectively, the shaver of the present invention is used by making one direction shaving strokes (like all other shavers with elongated handles do), but instead of stopping to rinse out the clogged blades, the user simply rotates the shaving head 180 degrees. This repeatable rotating action repeatedly cleans out the clogged shaving cartridge while keeping the other cartridge clean and sharp throughout the shave.

With the handle-less shaver 80, the user's hand is very close to the shaving surface, which eliminates leverage issues found in shavers with elongated handles, so control with this shaver is unmatched, making nicks and scrapes far less likely.

The foregoing descriptions and depictions are by no means limiting, and the invention's scope is broader than the specific embodiments so described. A person of ordinary skill in the art would readily recognize many modifications and substitutions to the described embodiments, and the scope of the present invention is intended to include all such modifications and substitutions.

The invention claimed is:

1. A shaving device, comprising:

an elongate handle;

a shaving head having a first cartridge of blades and a second cartridge of blades, the first cartridge of blades oriented opposite the second cartridge of blades;

a rotating bracket mounting the shaving head to the elongate handle, the rotating bracket configured to transpose the first and second cartridge of blades relative to the handle through rotation of the shaving head one hundred eighty degrees; and a locking mechanism for locking the shaving head at zero and one hundred eighty degrees of rotation;

wherein the transposition of the rotating bracket is configured for manual rotation without removing the shaving head from the handle.

2. The shaving device of claim 1, wherein the shaving head pivots with respect to the elongate handle.

3. The shaving device of claim 2, wherein the orientation of the first cartridge of blades and the second cartridge of blades are oriented in diametrically opposed directions on the shaving head.

* * * * *